Aug. 22, 1967   R. A. HEISLER   3,337,385
FILM SPLICING DEVICE

Filed April 8, 1965   2 Sheets-Sheet 1

INVENTOR.
RAYMOND A. HEISLER
BY
Ralph R Roberts
AGENT

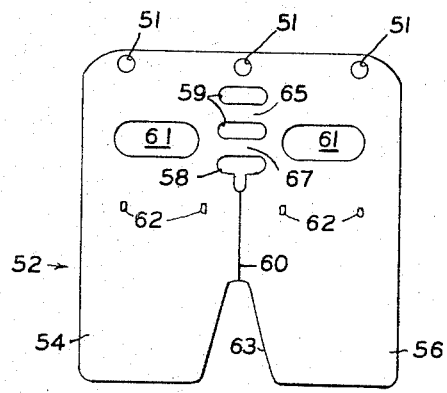
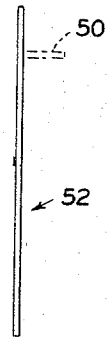
Fig.8    Fig.9
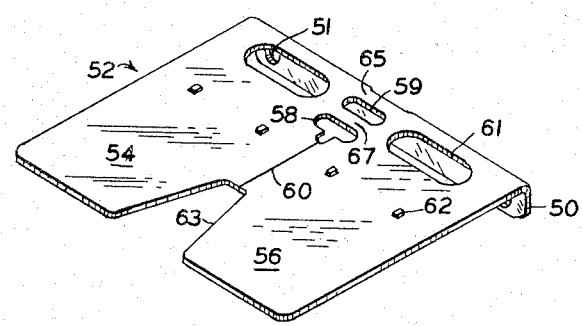
Fig.10

United States Patent Office 3,337,385
Patented Aug. 22, 1967

3,337,385
FILM SPLICING DEVICE
Raymond A. Heisler, Dakota Trails,
Franklin Lakes, N.J. 07417
Filed Apr. 8, 1965, Ser. No. 446,504
10 Claims. (Cl. 156—506)

This invention relates to a film splicing device adapted particularly for motion picture film.

Even more particularly this invention relates to a one-piece device for trimming motion picture film or film of similar strip type so as to provide ends of the film trimmed for butt splicing.

Even more particularly this invention relates to a one-piece splicing device in which is provided an aligning and cutting means for trimming either eight or sixteen millimeter film so that this trimmed film may be butt spliced.

The splicing of movie film and particularly the "home" movie film of the eight and sixteen millimeter sizes is an old art. Much equipment, devices and processes have been developed to make the splicing of film more easy and foolproof. Of recent development is the butt splice in which film is trimmed so as to be brought together in end-to-end relationship and by means of specially designed transparent pressure-sensitive tape such as Kodak Presstape to splice said trimmed tape. The accurate aligning and/or spacing of the spliced film is important so that the film and its sprocket/receiving apertures are evenly and properly spaced and aligned so as to mate with the sprocket drives of film using apparatus.

It is an object of this invention to provide a simple, inexpensive device for positioning and trimming two lengths or strips of film such as eight millimeter movie film and the like and to align these cut film members for butt splicing together by means of a length of pressure sensitive tape.

It is a further object of this invention to provide a trimming device of simple structure which, as shown, is preferably made from one piece. This device being of simple operation and adapted to be manipulated to trim adjacent ends of film so that they may abut and be retained in aligned splicing position during the application of a splicing tape member.

The attainment of these and other objects are found in the present invention wherein in both a preferred and alternate embodiment and made from a piece or strip of metal there is punched and formed a trimming device having a common back support. From this support there extends a table which is divided intermediate its ends so that there are two portions each movable in respect to the other and to a common plane. An adjustably predetermined spaced relationship between the facing edges of these adjacent table portions provides a means for cutting and trimming. Lugs for engaging and retaining the sprocket-receiving apertures of the film are formed on each table portion and are spaced and aligned to each other and to the whole combination so that the spliced film can be transported in the desired manner through a projector or viewer.

The most important features of the present invention have been outlined rather broadly in order that the detailed description thereof which follows may be appreciated. There are, of course, additional features of the invention which will be described hereafter and which will also form the subject of claims appended hereto. Those persons skilled in the art will appreciate that the conception on which the present disclosure is based may readily be utilized as the basis for designing other similar structures for carrying out the several purposes of this invention. It is important, therefore, that the claims be regarded as including such equivalent constructions as do not depart from the concept and scope of this invention.

A preferred embodiment and modification thereof has been chosen for purposes of illustration and description and is shown in the accompanying drawings forming a part of the specification wherein:

FIG. 8 represents a plan view, before bending, of an alternate construction of the splicer of this invention;

FIG. 9 represents a side view of the plate comprising the splicer of FIG. 8 and showing in phantom outline the back support that is formed by bending a portion of the plate; and FIG. 10 represents an isometric view of the alternate splicer of FIG. 8.

Figure 1:
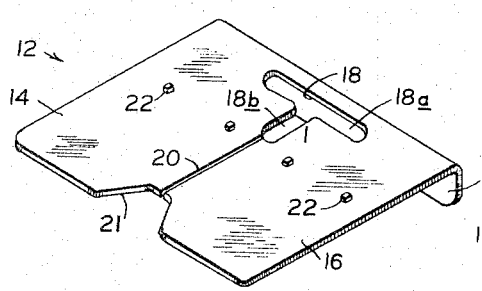
FIGURE 1 represents an isometric view of the splicer of this invention.

Referring now more particularly to the drawings and the several figures, the invention as shown in FIGS. 1–7 comprises a splicer cut and formed from a single piece of metal. The preferred embodiment shown and as reduced to practice, is a plate made of steel of eighteen gauge thickness (approximately three - sixty - fourths inches) and may be stamped and formed from a strip of metal. A back support 10 extends the width of the splicer and is formed by bending a portion of the plate at about right angles to the general plane this back support providing a means for attachment or mounting of the splicer to a frame or base of some apparatus, not shown, such as an editor or projector. Extending from support 10 and at substantially right angles thereto is a table 12 which is divided into a left portion 14 and a right portion 16.

As shown in FIGS. 1–5 there is formed in the table 12 a T-shaped relief 18 which serves a dual purpose. The top bar portion 18a of the relief 18 reduces the amount of attachment of each table portion to the back support and permits the portions 14 and 16 to be more easily deflected from the normal plane of the table 12. The stem portion 18b of relief 18 reduces the amount of trimming edge 20 formed by the separation of the table 12 into portions 14 and 16. Trim edge 20 extends from 18b to notch 21 with the stem portion 18b being made of a length such that the remaining shearing length of trimming edge 20 extending to notch 21 is greater than the width of the film to be cut and provides easy alignment and trimming of the film. As the surface 20 is preferably produced by a die cut the contiguous relationship of the edges 20 thus produced is variable. A precise spacing of the edges 20 in the desired proximity to each other is obtained by bowing support 10. The formation of stem 18b in reducing the length of the edges 20 enables the bowing of support 10 to be effected without undue rubbing of edges 20 and particularly at the inner portion of edges 20 adjacent the stem 18b.

Also provided on each of the table portions 14 and 16 are lugs 22 which are aligned and spaced so as to match and align the sprocket-engaging apertures normally provided in the particular type of movie film to be spliced. As reduced to practice, these lugs 22 are "coined" or "embossed" in the table portions 14 and 16 and, as thus formed, project a short distance above the upper surface of the table portions. These lugs 22 are preferably spaced so as to accommodate every fourth sprocket-engaging aperture of an eight millimeter film. The trimming edge 20 is preferably spaced in relation to lugs 22 so that the trimmed end of a film will be cut precisely at the center of the film aperture. However, the lugs 22 can be arranged on other even numbered plural spacings of the apertures of an eight millimeter film. It is to be noted that a sixteen millimeter film has a sprocket-engaging aperture spacing double that of the spacing of the eight millimeter film and so can be placed on the even-spaced lugs 22 and can be trimmed and spliced in the same manner as an eight millimeter film.

Figure 2:
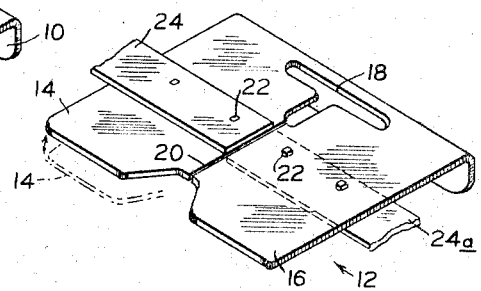
FIGURE 2 represents an isometric view of the splicer of FIG. 1 and showing one element of film trimmed and lying in alignment on the left table portion.

As seen in FIG. 2 a piece of film 24 is placed on the lugs 22 while the table portion 14 is in the depressed position as indicated by the phantom outline. The depressing of the table portion is usually accomplished by the operator urging the table portion downward with a thumb or finger. After the film has been aligned and placed on the lugs 22 located on the table portion 14 and with the undesired portion 24a of film 24 arranged under table portion 16, the portion 14 is released to move to the position shown in solid outline and as urged or carried by the bias of the metal attachment to back support 10. The upwardly transported film 24 lying on the table 14 is cut at edge 20 and the severed and undesired portion 24a of the film which remains under table 16 is removed from thence and normally discarded.

Figure 3:
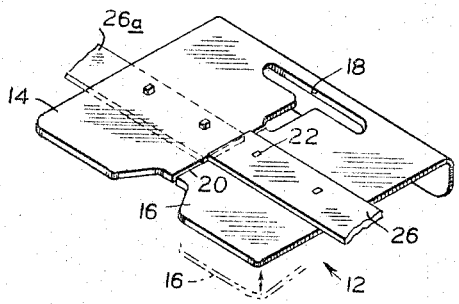
FIG. 3 represents an isometric view of the splicer of FIG. 1 and showing another element of film trimmed and lying in alignment on the right table portion.

As seen in FIG. 3 the operation of FIG. 2 is repeated but in reverse. A different portion of film 26 which is intended to be spliced to film 24 is placed on the downwardly deflected table portion 16 as shown in phantom outline and is located and aligned on the lugs 22. The to-be-trimmed portion 26a is brought under table portion 14 and then the table portion 16 with film 26 thereon is released so as to move upwardly as urged by the bias in the metal attachment to back support 10. The table portion 16 moving to the plane of table portion 14 and in so doing film 26 is cut at edge 20. The severed and undesired portion 26a remains under the table and from thence is removed and disposed.

Figure 4:
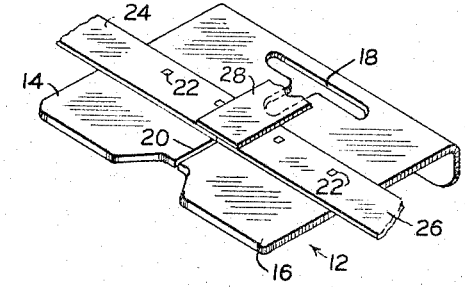
FIG. 4 represents an isometric view of the splicer of FIG. 1 and showing two elements of film trimmed and in end-to-end arrangement and being spliced with a portion of pressure sensitive tape.

In FIG. 4 the trimmed films 24 and 26, having been cut as described in reference to FIGS. 2 and 3 above, are placed on lugs 22 and having been trimmed at the same edge 20 are disposed to lie in adjacent end-to-end relationship. A splicing tape 28 which may be pre-cut tape of transparent plastic and with a pressure-sensitive adhesive on one side is applied to the ends of the film portions. Such a tape is currently being marketed by Eastman Kodak Co. under the trade name of Kodak Presstape.

Figure 5:
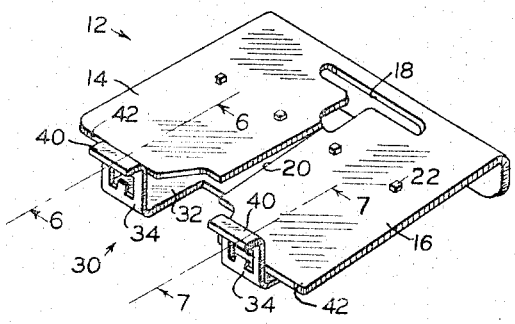
FIG. 5 represents an isometric view of the splicer of FIG. 1 with auxiliary means for holding the table portions in a releasable depressed position.
Figure 6:
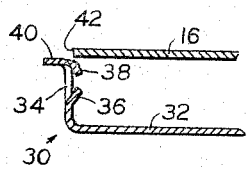
FIG. 6 represents a sectional view on the line 6—6 of the splicer and holding means shown in FIG. 5.
Figure 7:
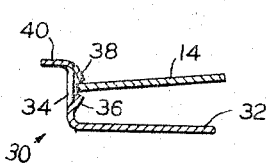
FIG. 7 represents a sectional view on the line 7—7 of the splicer and holding means shown in FIG. 5.

In FIGS. 5-7 is shown the trimming and splicing apparatus of FIGS. 1-4 with an additional auxiliary table holding means. This holding means is intended to assist the user in holding either table portion 14 or 16 in the deflected position. Accordingly there is provided a spring clip assembly 30 which, as shown, is a flat plate 32 having like upstanding legs 34 having tabs 36 and 38 formed in each like leg. A finger shelf 40 extends outwardly from the upper end of each leg 34. In use as the table portion 14 or 16 is pushed downwardly the outer edge 42 of the table engages the sloped inner surface of tab 38 and urges leg 34 outwardly until the edge 42 of the table passes into the space between tabs 36 and 38. After passing tab 38 the outer edge 42 of the table no longer urges leg 34 outwardly and so leg 34 returns to its normal position whereupon the end of the inwardly and upwardly extending tab 36 engages the table and prevents further downward movement of the table. Tab 38 having also moved inwardly with leg 34 the end of the inwardly and downwardly formed tab 38 engages the table and provides a lock or stop to prevent unwanted upward movement of the end of the table. When it is desired for the table to move upwardly to its normal plane, the operator presses on finger shelf 40 causing leg 34 to move outwardly and simultaneously therewith carrying tab 38 outwardly thereby disengaging the end 42 of the table and releasing the table.

Although no particular manner of attachment of the trimming plate and table holding means is shown, it is contemplated that attachment may be made by screws, rivets, spot welding or by retaining grooves. Attachment is only necessary so as to provide a base for ready manipulation. The splicer of FIG. 1 can be held and manipulated for trimming and splicing, however, if the spring clip assembly 30 is to be used in conjunction with the splicer, it and clip assembly 30 must be mounted in fixed relationship to each other.

It is to be noted that the support 10 is shown as being at substantially right angles to table 12. This is the preferred arrangement as it permits easy adjustment of edges 20 by the bowing of support 10, however, this support 10 can be in the same plane as table 12 or at a slight angle thereto as required by the design of the member to which the device is to be attached. Even while lying in the flat plane of table 12, it is possible to bow the support 10 and by this means to adjust the relationship of the edges 20 to each other.

Referring now to the alternate embodiment shown in FIGS. 8-10 wherein a splicer, similar to the prior described splicer, is made of metal which is preferably steel of twenty gauge (thirty-six thousandths of an inch). The blank exemplified in plan view in FIG. 8 provides for mounting holes 51 with which to support table 52. This table 52 in the manner of table 12 is divided into a left portion 54 and a right portion 56. As in the preferred embodiment of FIG. 1, this alternate embodiment also provides a T-shaped relief 58, however this T-shaped relief is of a much smaller size than T relief 18. Additional reliefs 59 provide a means of reducing the mass extending from the trimming edge 60 to the back support 50. Larger elongated slot portions 61 also provide for the removal of a substantial portion of the connecting material forming the bias or spring portion between table portions 54 and 56 and the back support 50.

As in the table portion 14 and 16 there are lugs 62 provided in the table portions 54 and 56. These lugs are aligned and spaced so as to match and align the sprocket-engaging apertures normally provided in the particular type of film to be spliced. As with lugs 22, these lugs 62 are preferably "coined" or "embossed" in the table portions 54 and 56 and, as thus formed, project a short distance above the upper surface of the table portions. Lugs 62 are preferably spaced so as to accommodate every fourth sprocket-engaging aperture of an eight millimeter film. The trimming edge 60 also is preferably spaced in relation to the pattern of lugs 62 so that the trimmed ends of the film will be cut precisely at the centre of a film aperture.

It is to be noted in this embodiment that the upper relief 59 becomes a part of the back support 50 and serves a dual purpose in that it permits back support 50 to be more readily bowed and when so bowed to eliminate or reduce "puckering," "bunching" or "stretching" of the metal at the juncture of back 50 and table 52 and particularly the metal portion lying in the line established by cutting edge 60, notch 63 and the mid-point of back support 50. To provide a closer control of the deflecting of the tables 54 and 56 and to provide for manipulative alignment of the cutting edge 60 there are connecting strips 65 and 67 between the two reliefs 59 and between relief 59 and T-shape relief 58. These bars provide positive longitudinal spacing members while in conjunction with slots 61, the reliefs 58 and 59 provide for only four transverse connecting member portions for the carrying of the table 52 by the back support 50. The extended tables 54 and 56 require a deep notch 63 to define a cutting edge of about eleven-sixteenths inch.

When mounted to apparatus not shown this splicer of FIG. 10 is readily adjustable to provide optimum results. By bowing back support 50 the cutting edge 60 can be adjusted for positive clearance as in a manner described above, however by providing intermediate transverse connection members which provide biasing means, the table portions 54 and 56 are connected to the back support 50 over longer span than in FIG. 1 and hence provide for a more precisely controlled alignment of the tables by the bowing of back support 50.

The terms "up," "down," "in," "out," "left," "right" and similar terms are applicable to the apparatus as described in conjunction with the accompanying drawings and it is to be noted that such terms are merely for the purpose of description and do not necessarily apply to a position in which the apparatus may be constructed or used.

The invention in its broader aspects is not limited to the specific combinations shown and described but departures may be made therefrom within the scope of the accompanying claims, without sacrificing its chief advantages.

What is claimed is:

1. A device for the trimming and the butt splicing of a pair of film strips having spaced sprocket-receiving apertures therein, the splicing device adaptable for mounting on a base and other apparatus and being formed and made of a one-piece construction and comprising: (1) a common back support for mounting of the splicing device to other apparatus; (2) a film supporting table portion extending from the common back support and having a relief formed in the table portion intermediate the ends of the table and the front and back edges of the table; (3) a cutting edge formed by the separation of said table portion at a point intermediate its ends, the separated portions providing face-to-face edges providing a means for cutting film and the like and as thus formed said edges extending from the relief to the front edge of the table to provide right and left table portions, and the cutting edge means being of a length at least slightly greater than the width of the film being trimmed; (4) at least one reduced attaching portion extending from each of the right and left table portions to the back support and of such reduced section as to permit the deflection of either the right and left table portions to a position below the normal plane of the table; (5) spaced lugs formed in a line on each of the table portions with at least two spaced lugs being on each of the right and left table portions, each lug of such a shape and extending above the table surface to provide means for engaging the sprocket-receiving apertures of the film to be spliced, whereby when a strip of film is placed on the spaced lugs of a deflected table portion with the to-be-trimmed portion of film disposed below the other non-deflected table portion, the deflected table portion is released to move to its normal plane position and while so moving to such a position to bring the film on the table in the way of the underside of the table portion in the normal plane and to thereby cut and trim the film at this cutting edge, so that when a pair of film strips so trimmed are placed on the lugs of the right and left table portions disposed in their normal plane, the film strips are aligned and in end-to-end relationship are adapted for butt splicing together by means of a splice patch.

2. A device for the trimming and butt splicing of film strips as in claim 1 in which the relief portion formed in the table is T-shaped with the bar portion of the T disposed parallel to the common back portion and the stem portion of the relief disposed toward the forward edge of the table.

3. A device for the trimming and butt splicing of film strips as in claim 2 in which the spaced lugs in the table support surface are aligned and spaced to engage every fourth opening of eight millimeter film strips.

4. A device for the trimming and the butt splicing of a pair of film strips having spaced sprocket-receiving apertures therein, the splicing device being adaptable for mounting on a base and other apparatus and formed of a single piece of sheet metal and comprising: (1) a common back support for the mounting of the splicing device to other apparatus; (2) a film supporting table extending from and at substantially right angles to the common back support, the table portion having at least one relief formed in the table portion intermediate the ends of the table and the front and back edges of the table; (3) a cutting edge formed by the separation of a part of the table portion at a point intermediate its ends, the separated portion providing face-to-face edge portions providing the cutting edge and as thus formed extending from at least the one relief to the front edge of the table to thereby provide separably movable right and left table portions, and the cutting edge being of a length at least slightly greater than the width of the film being trimmed; (4) reduced attaching portions extending from each of the right and left table portions to the back support, each such reduced section of such a size as to provide a spring bias such as to permit the deflection of either the right and left table portions to a position below the normal plane of the table and by such bias to return to the normal plane; (5) spaced lugs formed in a line on the table portion with at least two spaced lugs being on each of the right and left table portions, each lug of such a shape and extending above the table surface to provide means for engaging the sprocket-receiving apertures of the film to be spliced, whereby when a strip of film is placed on the spaced lugs of a deflected table portion with the to-be-trimmed portion of film disposed below the other non-deflected table portion, the deflected table portion is released to move to its normal plane position and while so moving to such a position to bring the film on the table in the way of the underside of the table portion in the normal plane and to thereby cut and trim the film at this cutting edge, so that when a pair of film strips so trimmed are placed on the lugs of the right and left table portions disposed in their normal plane, the film strips are aligned and in end-to-end relationship are adapted for butt splicing together by means of a splice patch.

5. A device for the trimming and butt splicing of film strips as in claim 4 in which the relief portion formed in the table is T-shaped with the bar portion of the T disposed adjacent and parallel to the common back portion and so that the back portion can be bowed so as to bring the cutting edge portions of the table into the desired spacing in the edge-to-edge relationship, and in which the stem portion of the T relief is disposed toward the forward edge of the table to limit the extent of the cutting edge so that the back portion can be bowed to adjust the spacing of the cutting edges without the rubbing of the inward cutting edges.

6. A device for the trimming and butt splicing of film strips as in claim 5 in which there is provided a separate auxiliary table holding means providing for the holding of the right and left table portions in the deflected position and in which there is provided means for releasing the table portions from the deflected position.

7. A device for the trimming and butt splicing of film strips as in claim 6 in which the holding and releasing means is a spring clip assembly having legs with engaging tabs formed therein, the legs adapted to be mounted so that as the table portion is deflected the outer edge of the table will engage a holding tab and will be prevented from excessive deflecting by a stop tab, and when a release is desired the leg is urged outwardly into a position whereby the holding tab is disengaged from the outer edge of the table thereby releasing the table to move upwardly.

8. A device for the trimming and butt splicing of film strips as in claim 4 and in which there are a plurality of relief portions, a first relief disposed in the common back support said relief adjacent the bend forming the back support and table and providing means for bowing the back support without bunching and stretching the metal forming the table, and a plurality of reliefs including a T-shaped relief from which the cutting edge extends to the front edge of the table.

9. A device for the trimming and butt splicing of film strips as in claim 8 in which the plurality of reliefs include the first relief and a T-shaped relief with the bar portion of the T disposed parallel to the common back portion and the stem portion disposed toward the forward edge of the table and connecting the separation forming the cutting edge.

10. A device for the trimming and butt splicing of film strips as in claim 9 in which the plurality of reliefs in addition to said first relief and said T-shaped relief includes at least one relief disposed on each side of a line connecting the first and T-relief, the pattern of reliefs providing longitudinal spacing members and providing at least two transversely spaced connecting members extending from each table portion to the back support and by these transverse members providing biasable means for the back support to carry the table portion.

References Cited
UNITED STATES PATENTS 3,142,607   7/1964   Scherer _____ 156—506

EARL M. BERGERT, *Primary Examiner.*

D. J. DRUMMOND, *Assistant Examiner.*